United States Patent [19]

Flannery et al.

[11] 4,309,218

[45] Jan. 5, 1982

[54] CHEMICALLY DURABLE PHOSPHATE OPAL GLASSES

[75] Inventors: James E. Flannery, Corning; John L. Stempin, Beaver Dams; Dale R. Wexell, Corning, all of N.Y.

[73] Assignee: Corning Glass Works, Corning, N.Y.

[21] Appl. No.: 203,317

[22] Filed: Nov. 3, 1980

[51] Int. Cl.³ .......................... C03C 3/04; C03C 3/08
[52] U.S. Cl. .......................................... 501/32; 65/33; 65/45; 501/63
[58] Field of Search .......................... 106/54, 50, 39.6

[56] References Cited

U.S. PATENT DOCUMENTS

| | | | |
|---|---|---|---|
| 2,394,502 | 2/1946 | Weyl | 106/52 X |
| 2,559,805 | 7/1951 | Stookey | 106/54 X |
| 3,498,801 | 3/1970 | Keul | 106/54 X |
| 3,498,805 | 3/1970 | Stalego | 106/50 |
| 3,506,464 | 4/1970 | Baak et al. | 106/54 |
| 3,645,711 | 2/1972 | Pirooz | 106/54 X |

*Primary Examiner*—Helen M. McCarthy
*Attorney, Agent, or Firm*—Clinton S. Janes, Jr.

[57] ABSTRACT

This invention relates to the manufacture of spontaneous opal glasses demonstrating a dense, milky-white appearance, excellent resistance to attack by water and detergents, softening points in excess of 760° C., and containing either $NaBaPO_4$ or $Na_5P_3O_{10}$ as the predominant crystal phase. The glasses consist essentially, expressed in weight percent on the oxide basis, of 6-12% $Na_2O$, 5-16% BaO, 0.9-7% $Al_2O_3$, 2-7% $B_2O_3$, 55-70% $SiO_2$, and 5-9% $P_2O_5$.

2 Claims, 2 Drawing Figures

CHEMICALLY DURABLE PHOSPHATE OPAL GLASSES

BACKGROUND OF THE INVENTION

United States Application Ser. No. 177,627, filed Aug. 13, 1980 by the present inventors, discloses spontaneous opal glasses having compositions within the $Na_2O$-$K_2O$-$BaO$-$Al_2O_3$-$SiO_2$-$P_2O_5$-F system and containing $Ba_2F(PO_4)$ as the predominant crystalline opal phase. Those glasses exhibited a dense white appearance, a softening point of at least 710° C., and excellent chemical durability, particularly against dishwasher detergents. Whereas those glasses demonstrate characteristics strongly recommending their utility in food service applications, the inherent ready volatility of fluorine during melting and forming of the glass creates a very real enviromental problem which can be solved, but at considerable expense. Moreover, the presence of fluorine in the glass leads to more rapid corrosion of melting unit refractories as well as molds and other glass forming means. Accordingly, practical benefits could be derived by eliminating fluorine from the glass, providing the desired properties of the glass can be maintained. Furthermore, fluorine is a potentially toxic material which could contaminate food brought into contact therewith via diffusion from, or attrition of, the glass surface. Hence, to completely forestall that possibility, the application of a non-toxic glaze to the surface of the glass may be required. This factor provides another reason for removing fluorine from the glass composition.

SUMMARY OF THE INVENTION

The primary objective of the instant invention is to produce spontaneous opal glasses manifesting a dense, milky-white appearance, excellent resistance to attack by water and alkaline media (particularly detergents), and softening points in excess of 760° C., thereby permitting the application of high temperature decorating frits where desired. Those properties render the glasses especially suitable for food service applications.

The inventive glasses consist essentially, expressed in weight percent on the oxide basis, of 6-12% $Na_2O$, 5-16% $BaO$, 0.9-7% $Al_2O_3$, 2-7% $B_2O_3$, 55-70% $SiO_2$, and 5-9% $P_2O_5$. Optionally, the glasses may also contain up to 3% $MgO$, up to 7% $K_2O$, up to 2.5% $Li_2O$, and $SrO$ and/or $CaO$ may be substituted for $BaO$ and/or $Na_2O$, but ought not to exceed levels of 7% and 4%, respectively. The sum of those ingredients plus any other extraneous components will not be greater than about 10%. X-ray diffraction analyses have identified the predominantly opacifying phase to be either $NaBaPO_4$ or $Na_5P_3O_{10}$ with minor phases being present related to magnesium phosphosilicate and/or calcium orthophosphate-type crystal species which have not been completely identified as yet.

The inventive glasses are subject to a two-stage liquidus phenomenon. A high temperature (1000°-1500° C.) emulsion liquidus has been observed which corresponds to a liquid-liquid phase separation wherein droplets of the opacifying phase are developed and dispersed within the principal glass phase. Analysis of the separating phase has determined it to be rich in $Na_2O$, $BaO$, and $P_2O_5$. The crystalline opal liquidus is found at a lower temperature, viz., 500°-1000° C., the temperature thereof being dependent upon the relative concentration of the individual constituents in the separating phase.

Maintaining the base glass composition within the above-cited ranges is vital to achieving the desired high softening point, excellent chemical durability, and dense white opacity. $Na_2O$, $BaO$, and $P_2O_5$ are self-evidently the critical components in the development of the crystalline opal phase. Levels of $Na_2O$ of about 10-12% are preferred to ensure a desirable working viscosity in the glasses at temperatures below 1300° C. and to maintain an emulsification temperature below 1300° C. At 13% $Na_2O$ the glasses begin to lose opacity due to the excessive fluxing action of the $Na_2O$. $BaO$ values of about 5-10% are preferred to provide minimum microwave susceptibility consistent with use as culinary ware or food service ware in a microwave oven and to hold the density of the glasses below 2.7 g/cc. The content of $P_2O_5$ will be maintained less than 9% to keep the emulsion liquidus below 1300° C., to reduce pollution of the environment through volatilization from the melt, to lessen attack on molds and other glass forming means, and to improve the melting behavior of the glasses. $P_2O_5$ at the 6-7% level is generally preferred to develop the crystalline opal phase for dense, milky-white opacity.

In the preferred glasses, the $Al_2O_3$ and $B_2O_3$ contents on a weight percent basis are approximately equivalent. $B_2O_3$ values in excess of 7% lead to the glasses becoming too soft for decorating with non-toxic enamels and being essentially non-crystalline, phase separated phosphoborosilicates. Thus, those glasses are substantially free from crystallization and are readily attacked by alkaline environments as is evident not only from a loss of weight but also by a deterioration of glossy appearance.

$Al_2O_3$, optionally with $MgO$, is employed to endow a high softening point and resistance to detergent attack to the glass. However, levels of $Al_2O_3$ above 7% and $MgO$ above 3% greatly increase the high temperature viscosity of the glass, thereby rendering it too stiff for the conventional forming operations. Such excessive amounts also cause melting of the glass to become more difficult.

$K_2O$ can be substituted for $Na_2O$ or $BaO$ to harden the glass at high temperatures and at the softening point. The substitution of $K_2O$ for $Na_2O$ also tends to enhance the detergent resistance of the glass. The fluxing capability of $K_2O$ also helps to reduce the emulsion liquidus while enabling the use of higher levels of $Al_2O_3$ and $SiO_2$. Nevertheless, $K_2O$ contents greater than 7% tend to decrease the opacity in the glass due to excessive fluxing action.

$Li_2O$ exerts a fluxing action and also acts to reduce the overall coefficients of thermal expansion of the glasses and increase the amount of phase separation in those glasses having low levels of $Na_2O$, $BaO$, and/or $P_2O_5$. Amounts of $Li_2O$ greater than 2.5%, however, will drive the emulsion liquidus temperature above 1400° C. which invariably results in a "mother-of-pearl" surface on pressed ware.

$SrO$ and $CaO$ will be held below 7% and 4%, respectively, in order to forestall the emulsion liquidus temperature rising above 1400° C.

The opacification mechanism underlying the inventive glasses is believed to be as follows: The molten glass cools from a clear and homogeneous state through a temperature region wherein an "emulsion" is produced through the separation of two glassy phases. This emulsion can be observed in FIG. 1, an electron micrograph showing the cross section of an inventive glass sample which had been quick quenched from a temperature above the emulsion liquidus. The rapid cooling stabilized the liquid-liquid separation as is evident by the presence of many spherules. Thereafter, the glass cools through a lower temperature range in which crystals develop from the emulsion globules to form the opacifying particles. FIG. 2 illustrates that phenomenon. Hence, FIG. 2 is an electron micrograph showing a cross section of an inventive glass sample after being annealed. The emulsified phase exhibited in FIG. 1 has consolidated resulting in the formation of crystalline spherules suspended in a glassy matrix.

The separation of the two glassy phases appears to be almost instantaneous, but the growth of the emulsion globules is relatively slow. Accordingly, if the molten glass is cooled rapidly from a temperature above the emulsion liquidus, the crystalline particles resulting are submicroscopic in size and yield a uniformly dense opal glass. In contrast, if the molten glass is held for any substantial length of time at a temperature somewhat below the emulsion liquidus, the globules will grow to an undesirable size. Consequently, the working temperature of the glass must be higher than the emulsion liquidus to ensure the production of a satisfactory opal.

Because of the high temperature liquid-liquid phase separation evidenced by glasses in the $Na_2O$-$BaO$-$Al_2O_3$-$B_2O_3$-$SiO_2$-$P_2O_5$ composition system, those glasses are quite prone to "mother-of-pearl" formation on pressed ware. That surface iridescence is derived from the refraction and reflection of light from elongated crystals on the glass surface. The liquid droplets or globules of phase separation precipitated on the glass surface at about the emulsification temperature are distorted and elongated as the glass is being shaped through pressing. This phenomenon results in elongated crystal growth during subsequent cooling of the glass. Therefore, a good pressed ware surface can be secured only if the pressing is conducted at a temperature sufficiently in excess of the emulsion liquidus to permit subsequent crystal nucleation in the bulk glass while minimizing phase separation and nucleation at the surface. "Mother-of-pearl" surfaces exhibit a loss of gloss relatively rapidly when subjected to alkaline environments. Hence, the elongated crystals are readily attacked by an alkaline medium. Accordingly, the glasses will preferably be pressed at temperatures about 50°–80° C. above the emulsification liquidus to minimize or eliminate "mother-of-pearl" formation.

Where a colored opal glass is desired, conventional glass colorants, e.g., $CoO$, $Cr_2O_3$, $CuO$, $Fe_2O_3$, $MnO_2$, $NiO$, and $V_2O_5$, may be included in the base composition in customary quantities, usually less than about 2% by weight.

PRIOR ART

Figure 1:
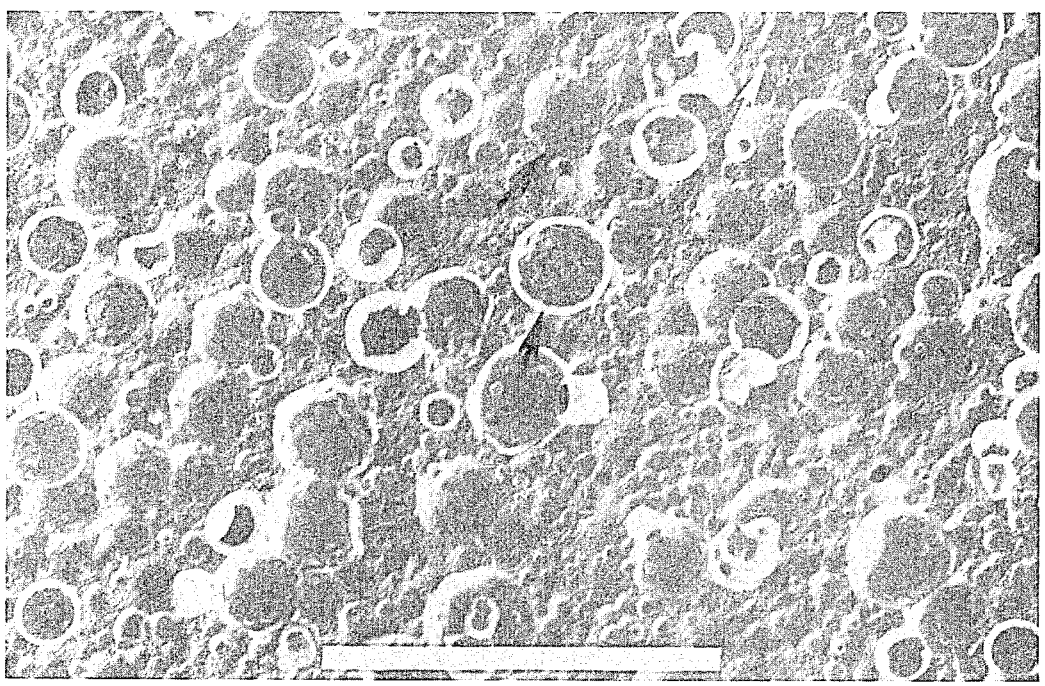
FIG. 1 is an electron micrograph illustrating the liquid-liquid phase separation taking place in the inventive glasses.

U.S. Pat. No. 2,394,502 discloses the production of opal glasses containing fluorapatite [$3R_3(PO_4)_2.RF_2$] as the primary opal phase, wherein R is selected from the group of Ba, Ca, and Pb. The glasses consist essentially, in weight percent on the oxide basis, of 12–17% $Na_2O+K_2O$, up to 12% CaO, up to 4% BaO, up to 5% PbO, 0–6% $Al_2O_3$, 0–50% $B_2O_3$, 4–9% $P_2O_5$, 54–66% $SiO_2$, and 2.5–5% F. The compositions contain F, are lower in BaO than demanded in the inventive glasses, and the crystalline opacifying phase is unlike the $NaBaPO_4$ or $Na_5P_3O_{10}$ crystals developed in the inventive glasses.

U.S. Pat. No. 2,559,805 describes the production of opal glasses containing $Ba_3(PO_4)_2$ as the predominant crystalline opacifying phase. The glasses consist essentially, in weight percent on the oxide basis, of 7–15% alkali metal oxide, 5–25% BaO, 0–25% $B_2O_3$, 2–10% $P_2O_5$, 0–10% $Al_2O_3$, and 50–70% $SiO_2$. Although the ranges of the constituents are very broad, the crystalline opacifying phase is dissimilar from the $NaBaPO_4$ or $Na_5P_3O_{10}$ crystals generated in the inventive glasses. Furthermore, none of the working examples comes within the range of the present inventive compositions.

U.S. Pat. No. 3,498,801 discusses the manufacture of opal glasses wherein a liquid-liquid phase separation provides the opacification. The glasses consist essentially, in weight percent on the oxide basis, of 9–13.5% alkali metal oxide, 1–2% CaO, 4–8% $Al_2O_3$, 5–12% $B_2O_3$, 60–68% $SiO_2$, and 3–5.5% $P_2O_5$. The glasses have no crystalline opacifying phase and BaO is reported in a single working example as being present in an amount of 1%.

U.S. Pat. No. 3,506,464 discloses opal glasses wherein the opacification is derived from a liquid-liquid phase separation. The compositions therefore consist essentially, in mole percent on the oxide basis, of 3–6% $Na_2O$, 0–6% $Al_2O_3$, 7–11% $B_2O_3$, 78–85% $SiO_2$, and 1–6% $P_2O_5$. BaO is nowhere mentioned in the specification and there is no crystalline opal phase present.

DESCRIPTION OF THE PREFERRED EMBODIMENTS

Table I reports glass compositions, expressed in terms of parts by weight on the oxide basis as calculated from the batch, illustrating the inventive products. Inasmuch as the sum of the several constituents totals or approximately totals 100, for all practical purposes the tabulated figures may be deemed to reflect the compositions in terms of weight percent. If considered necessary, a fining agent such as an oxide of arsenic or a chloride salt can be added to the batch.

The actual batch ingredients may comprise any materials, either the oxides or other compounds, which, when melted together, will be converted into the desired oxide in the proper proportions. Whereas the following description is directed to laboratory scale melting and forming, it will be appreciated that the recited compositions would also be operable in large scale melting units.

The batch ingredients were compounded, tumble mixed together to assist in obtaining a homogeneous melt, and run into platinum crucibles. The crucibles were introduced into an electrically-fired furnace operating at 1500° C. and the batches melted for four hours. The melts were thereafter cast into steel molds to produce slabs about 6"×6"×½" or manually pressed into discs having diameters of about 3–4" and thicknesses of about 0.125–0.25". The pressed discs reflected a somewhat rudimentary simulation of commercial automatic pressing. The glass slabs were immediately transferred to an oven operating at about the annealing temperature, that temperature maintained for about one hour, and the slabs then cooled to room temperature at furnace rate, i.e., at about 30° C./hour. The density of the opacification was such that the samples demonstrated no translucency in the annealed slabs. The density of the opacification developed in the pressed ware varied in accordance with the proximity of the forming temperature employed to the emulsification temperature of the glass. Most preferably, the pressing temperature will not be more than about 80° C. above the emulsification temperature to insure dense opacity.

TABLE I

|  | 1 | 2 | 3 | 4 | 5 | 6 | 7 | 8 | 9 |
|---|---|---|---|---|---|---|---|---|---|
| $SiO_2$ | 61.56 | 61.20 | 62.20 | 60.46 | 62.67 | 58.92 | 61.30 | 56.01 | 60.00 |
| $Al_2O_3$ | 4.52 | 4.60 | 0.94 | 4.44 | 4.61 | 1.44 | 6.00 | 3.87 | 4.50 |
| $B_2O_3$ | 4.61 | 3.20 | 7.10 | 4.54 | 4.71 | 4.43 | 3.60 | 4.24 | 4.50 |
| $P_2O_5$ | 7.40 | 7.10 | 7.20 | 7.22 | 7.48 | 7.03 | 7.30 | 6.74 | 7.20 |
| BaO | 8.00 | 8.40 | 8.50 | 7.82 | 5.76 | 14.05 | 7.90 | 15.63 | 6.60 |
| $Li_2O$ | — | — | — | — | — | — | — | 0.41 | — |
| $Na_2O$ | 11.80 | 11.60 | 11.80 | 8.02 | 12.04 | 11.30 | 11.80 | 6.71 | 11.50 |
| MgO | 2.11 | 2.20 | 2.20 | — | 2.72 | 1.71 | 2.10 | — | — |
| $K_2O$ | — | 1.70 | — | 5.47 | — | — | — | 6.39 | — |
| SrO | — | — | — | — | — | — | — | — | 6.00 |

Table II records softening points (S.P.) in terms of °C. and coefficients of thermal expansion (Exp.) over the temperature range of 25°–300° C. expressed in terms of $\times 10^{-7}$/°C., both determinations being made in accordance with measuring techniques conventional in the glass art.

Fast cool emulsion and crystalline opal liquidus data (°C.) were obtained utilizing a hot stage microscope composite apparatus.

Samples of the glasses were screened for potential weathering problems by boiling in distilled water for one hour and analyzing the amount of $Na_2O$ present in the water. Samples wherein less than 4 μg $Na_2O/cm^2$ were extracted therefrom were deemed to be desirably resistant to weathering.

Samples of the exemplary compositions were examined for resistance to detergents by being immersed into a 0.3% aqueous solution of SUPER SOILAX ® brand detergent, marketed by Economics Laboratories, St. Paul, Minnesota operating at 95° C. for intervals of 24, 48, 72, and 96 hours. An exposure of 96 hours has been estimated to be equivalent to 10 years of use in a household dishwasher in an average home. The surface areas of the specimens were limited to the ratio of 12 square inches to one pound of the solution. The samples were removed periodically from the hot solution, rinsed in tap water, and wiped dry. A portion of each specimen was coated with DYE-CHEK ® dye penetrant, marketed by Magna-Flux Corporation, Chicago, Illinois, and the dye allowed to remain in contact therewith for 20 seconds. Specimens which exhibited no dye penetration, i.e., no stain was evident after the dye was wiped clean with a dry cloth, were classified as "AA". Samples from which the stain could be removed with a cloth dampened with SUPER SOILAX ® brand detergent, were categorized as "A". Specimens from which the stain could be removed with a dampened cloth followed by a commercial powdered cleanser were listed as "B". Finally, when the stain could not be removed by means of any of the above procedures, they were tabulated as "C". Upon receiving a rating of "B", the testing was concluded. Where visual observation indicated any loss of gloss in a particular sample during the testing procedure, that sample was labeled with a "loss of gloss" description which was deemed to be equivalent to a "C" rating.

TABLE II

|  | 1 | 2 | 3 | 4 | 5 | 6 | 7 | 8 | 9 |
|---|---|---|---|---|---|---|---|---|---|
| S.P. | 845 | 845 | 949 | 808 | 872 | — | — | — | — |
| Exp. | 85.1 | 92.1 | 85.5 | 89.5 | 84.3 | — | — | — | — |
| $Na_2O$ Extraction | 2.3 | 0.31 | — | — | — | — | — | — | — |
| Emulsion Liquidus 1240 | 1235 | 1100 | 1100 | 1070 | 1160 | 1000 | 1220 | 1400 |  |
| Crystalline Opal Liquidus | 680 | 680 | 605 | 640 | 560 | 765 | 550 | 760 | 857 |
| Detergent Rating |  |  |  |  |  |  |  |  |  |
| 24 hours | A | A | AA | A | A | AA | A | AA | A |
| 48 hours | A | A | A | A | A | AA | A | A | A |
| 72 hours | A* | A | A | A* | A* | AA | A* | A | A |
| 96 hours | A-C | A | A | A* | B | AA | A* | A | A |

*Loss of gloss

An examination of Tables I and II illustrates the necessity for exercising careful composition control in order to secure glasses manifesting the desired physical properties in conjunction with satisfactory melting and forming capabilities. Example 1 represents the most preferred compositions on an overall basis of forming behavior, chemical durability, and physical properties.

FIG. 1 is a replica electron micrograph showing a cross section of a disc of Example 1 which had been quick quenched from a temperature of about 1300° C. The arrows indicate droplets of the separated phase which are rich in $Na_2O$, BaO, and $P_2O_5$. The disc was essentially hazy under this forming condition.

Figure 2:
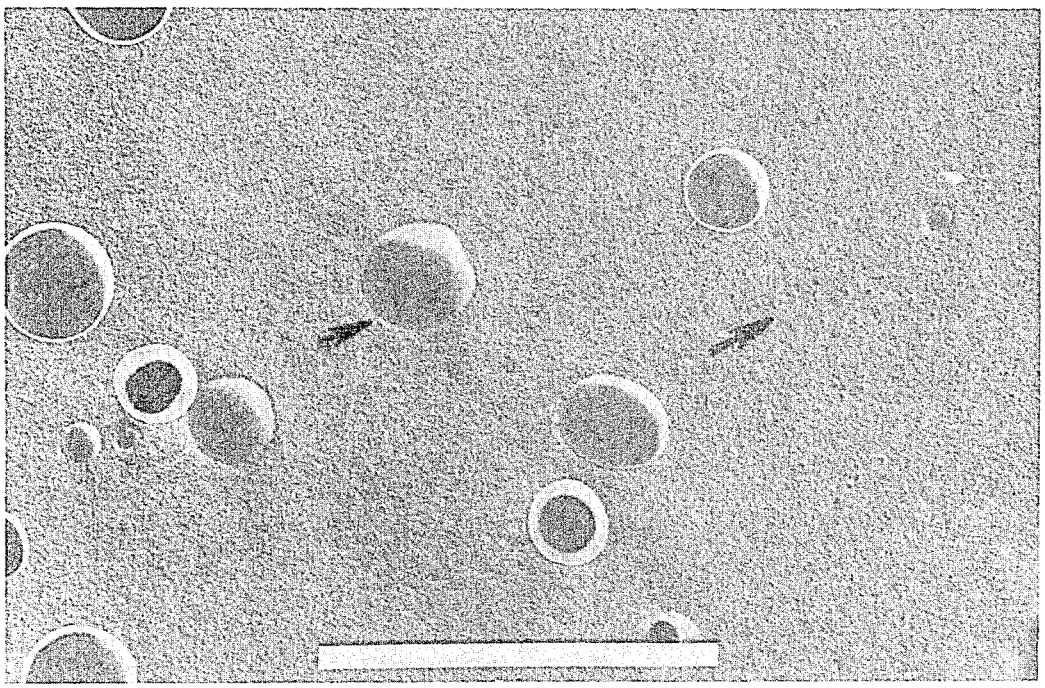
FIG. 2 is an electron micrograph illustrating the opal crystalline phase present in the inventive glasses.

FIG. 2 is a replica electron micrograph showing a cross section of a disc of Example 1 which had been pressed at 1300° C. and then annealed at 550° C. The arrows point out the consolidated droplets and crystallized material within the glass matrix.

We claim:

1. A fluorine-free spontaneous opal glass demonstrating a dense, milky-white appearance, excellent resistance to attack by water and alkaline media, a softening point greater than 760° C., and containing either $NaBaPO_4$ or $Na_5P_3O_{10}$ as the predominant crystal phase consisting essentially, expressed in terms of weight percent on the oxide basis, of 6–12% $Na_2O$, 5–16% BaO, 0.9–7% $Al_2O_3$, 2–7% $B_2O_3$, 55–70% $SiO_2$, and 5–9% $P_2O_5$.

2. A spontaneous opal glass according to claim 1 which also contains up to 10% total of oxides selected from the group in the indicated proportions of up to 3% MgO, up to 7% $K_2O$, up to 2.5% $Li_2O$, up to 7% SrO and up to 4% CaO.

* * * * *